United States Patent
Ishii et al.

(10) Patent No.: US 8,957,983 B2
(45) Date of Patent: Feb. 17, 2015

(54) SOLID-STATE IMAGING DEVICE

(71) Applicant: Panasonic Corporation, Kadomi-shi, Osaka (JP)

(72) Inventors: Motonori Ishii, Osaka (JP); Shigetaka Kasuga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 176 days.

(21) Appl. No.: 13/732,106

(22) Filed: Dec. 31, 2012

(65) Prior Publication Data
US 2013/0120625 A1 May 16, 2013

Related U.S. Application Data

(63) Continuation of application No. PCT/JP2011/000769, filed on Feb. 10, 2011.

(30) Foreign Application Priority Data

Jun. 29, 2010 (JP) .................................. 2010-147410

(51) Int. Cl.
*H04N 5/228* (2006.01)
*H04N 5/335* (2011.01)
(Continued)

(52) U.S. Cl.
CPC ............... *H04N 5/378* (2013.01); *H04N 5/374* (2013.01); *H04N 5/23212* (2013.01); *H04N 5/23293* (2013.01); *H04N 5/363* (2013.01)
USPC ........ 348/222.1; 348/294; 348/241; 341/126; 341/155

(58) Field of Classification Search
CPC ............................... H04N 5/335; H03M 1/007
USPC ................................. 348/222.1; 341/126, 169
See application file for complete search history.

(56) References Cited

U.S. PATENT DOCUMENTS

| 6,384,757 B1* | 5/2002 | Kosonen | 341/120 |
| 2005/0168363 A1* | 8/2005 | Harada | 341/118 |

(Continued)

FOREIGN PATENT DOCUMENTS

| JP | 05-327505 A | 12/1993 |
| JP | 05-327505 A | 12/1993 |

(Continued)

OTHER PUBLICATIONS

International Search Report issued in International Patent Application No. PCT/JP2011/000769 dated Mar. 15, 2011.

*Primary Examiner* — Nhan T Tran
*Assistant Examiner* — Chan Nguyen
(74) *Attorney, Agent, or Firm* — McDermott Will & Emery LLP

(57) ABSTRACT

A solid-state imaging device includes pixels, vertical signal lines, a high-order AD converter configured to convert M bits, a low-order AD converter, and first and second selection circuits. The first selection circuit is configured to output, in a normal mode, voltage of the selected vertical signal line and to output correction voltage in a correction mode. The high-order AD converter calculates $2^M$ residual voltage values each corresponding to a difference between a signal voltage value and each of $2^M$ threshold voltage values; outputs, in the normal mode, a high-order bit digital value corresponding to the maximum one of the $2^M$ threshold voltage values in a range below the signal voltage value, and outputs voltage having a residual voltage value corresponding to the maximum threshold voltage value; and outputs, in the correction mode, voltage having a residual voltage value corresponding to a selected threshold voltage value.

12 Claims, 10 Drawing Sheets

(51) Int. Cl.
*H04N 5/217* (2011.01)
*H03M 1/00* (2006.01)
*H03M 1/12* (2006.01)
*H04N 5/378* (2011.01)
*H04N 5/374* (2011.01)
*H04N 5/232* (2006.01)
*H04N 5/363* (2011.01)

(56) References Cited

U.S. PATENT DOCUMENTS

2006/0087468 A1* 4/2006 Oka .............................. 341/155
2006/0176205 A1 8/2006 Kawahito
2006/0227025 A1* 10/2006 El-Sankary et al. .......... 341/120
2012/0112939 A1* 5/2012 Miki et al. .................... 341/118

FOREIGN PATENT DOCUMENTS

| JP | 08-186493 A | 7/1996 |
| JP | 08-186493 A | 7/1996 |
| JP | 2002-124877 A | 4/2002 |
| JP | 2002-124877 A | 4/2002 |
| JP | 2004-304413 A | 10/2004 |
| JP | 4069203 | 1/2009 |
| WO | WO 2011048725 A1 * | 4/2011 |

* cited by examiner

SOLID-STATE IMAGING DEVICE

CROSS-REFERENCE TO RELATED APPLICATION

This is a continuation of PCT International Application PCT/JP2011/000769 filed on Feb. 10, 2011, which claims priority to Japanese Patent Application No. 2010-147410 filed on Jun. 29, 2010. The disclosures of these applications including the specifications, the drawings, and the claims are hereby incorporated by reference in their entirety.

BACKGROUND

The present disclosure relates to a solid-state imaging device.

In recent years, it is common to use a solid-state imaging device to electronically capture and store an image. The solid-state imaging device is typically called an "image sensor." The solid-state imaging device is categorized into two major types which are a CCD sensor (hereinafter simply referred to as a "CCD") and a MOS sensor or a CMOS sensor (hereinafter collectively referred to as a "CMOS sensor"). Such solid-state imaging devices each include a minute part (called a "pixel") configured to output an electrical signal corresponding to the intensity of incident light, and a plurality of pixels are arranged in a matrix, i.e., in rows and columns.

Needless to say, a signal output from each pixel is an analog signal. However, since, e.g., an electronic still camera to which the solid-state imaging device is applied requires a digital signal, conversion of an analog signal to a digital signal, i.e., AD conversion, is required.

Conventionally, it has been often the case that an analog signal is, for AD conversion thereof, output from a solid-state imaging device to outside. However, in such a case, there are the following disadvantages: noise is superimposed on an analog signal outside the solid-state imaging device; and an analog signal is changed due to a method for connecting the solid-state imaging device and an external device together. A solid-state imaging device including an AD converter and configured to output a digital signal to outside has been recently proposed.

High-speed processing is particularly required for an AD converter embedded in a CMOS sensor. This is because, if the AD converter can perform processing at a high speed, the frame rate of an image output from the CMOS sensor can be increased. Of pixels arranged in a matrix, an AD converter is provided exclusively for pixels in the same column in order to realize the high-speed processing of the AD converter. In order to realize higher-speed processing of the AD converter, a clock frequency is increased. However, due to the response speed of a transistor and a line delay, there is an increase limit in clock frequency. In addition, the increase in crock frequency may result in an increase in power consumption of the AD converter.

In order to overcome the foregoing disadvantages, a technique described in Japanese Patent Publication No. 2004-304413 has been proposed. A conventional solid-state imaging device will be described with reference to FIG. 9.

FIG. 9 illustrates the conventional solid-state imaging device.

Referring to FIG. 9, an AD converter configured to convert high-order N bits and an AD converter configured to convert low-order M bits are used. Thus, AD conversion is performed at two levels. Specifically, after the high-order N bits are converted by a high-order AD converter, a difference (analog residual) between an analog value corresponding to a high-order N bit value and an analog value of signal voltage is input to a low-order AD converter. In such a manner, AD conversion of an entire digital value is performed.

A high accuracy is not required for conversion of high-order N bits. Thus, as a method for converting high-order N bits, a high-speed method with low linearity is employed. As a method for converting low-order M bits, a low-speed method with high linearity is employed. For example, in the case where N=3 and M=7, there are only 128 low-order M bit patterns. Thus, AD conversion is completed in 128 clocks. As a result, while an accuracy of 10 bits (=3+7) is ensured, the processing speed of AD conversion can be increased.

SUMMARY

In the conventional solid-state imaging device configured to perform AD conversion at two levels, there is an advantage that the processing speed of AD conversion can be increased, but there is also a disadvantage. Even if continuously-changing analog values are input, output digital values are not always continuous to each other. For example, in the case where N=3 and M=9, digital values are as illustrated in FIG. 10. Referring to FIG. 10, when a value for high-order bits changes, the digital values become discontinuous.

In view of the foregoing, the present disclosure aims to ensure, in a solid-state imaging device, a sufficiently-high AD conversion processing speed and realize continuity of digital values.

Diligent study conducted by the present inventors shows that output digital values are discontinuous because a relationship between the high-order AD converter and the low-order AD converter is not taken into consideration for the conventional solid-state imaging device at all. The study further shows that it is necessary to reduce or prevent discontinuity of digital values that characteristics of the high-order AD converter and the low-order AD converter are measured before or after AD conversion and output digital values are corrected based on measurement results. In the technique described in Japanese Patent Publication No. 2004-304413, the relationship between the high-order AD converter and the low-order AD converter is not taken into consideration at all as described above. Needless to say, Japanese Patent Publication No. 2004-304413 fails to describe a method for correcting output digital values.

In order to overcome the foregoing disadvantages, a solid-state imaging device of the present disclosure includes a plurality of pixels arranged in rows and columns; a plurality of vertical signal lines each connecting pixels in each of the columns; a high-order AD converter configured to convert M bits; one or more low-order AD converters; a first selection circuit corresponding to the high-order AD converter; and a second selection circuit corresponding to the high-order AD converter. The first selection circuit selects, in a normal mode, one of the vertical signal lines to output voltage of the selected one of the vertical signal lines, and output correction voltage in a correction mode. The high-order AD converter calculates $2^M$ residual voltage values each corresponding to a difference between a signal voltage value obtained based on output of the first selection circuit and each of $2^M$ threshold voltage values, outputs, in the normal mode, a high-order bit digital value corresponding to a maximum one of the $2^M$ threshold voltage values in a range below the signal voltage value, and outputs voltage having a residual voltage value corresponding to the maximum one of the $2^M$ threshold voltage values, and outputs, in the correction mode, voltage having a residual voltage value corresponding to a selected threshold voltage value which is any one of the $2^M$ threshold voltage values. The second selection circuit selects one of the low-order AD converters to connect the one of the low-order AD converters to an output terminal of the high-order AD converter.

In the solid-state imaging device of the present disclosure, the high-order AD converter may include $2^M$ calculation sections each calculating and outputting an associated one of the $2^M$ residual voltage values corresponding respectively to the $2^M$ threshold voltage values and outputting a result indicating a magnitude relationship between the signal voltage value and each of the $2^M$ threshold voltage values, a selection circuit which outputs, based on the result indicating the magnitude relationship output from each of the $2^M$ calculation sections, the high-order bit digital value corresponding to the maximum one of the $2^M$ threshold voltage values in the range below the signal voltage value, and which selects the voltage having the residual voltage value corresponding to the maximum one of the $2^M$ threshold voltage values, and a selection circuit which selects voltage having one of the $2^M$ residual voltage values corresponding to the selected threshold voltage value.

The solid-state imaging device of the present disclosure may further include a calculation section configured to calculate, in the correction mode, a difference between an output value of one of the low-order AD converters in a case where voltage having a residual voltage value corresponding to a kth largest one of the $2^M$ threshold voltage values is output from the high-order AD converter and an output value of the one of the low-order AD converters in a case where voltage having a residual voltage value corresponding to a k+1th largest one of the $2^M$ threshold voltage values is output from the high-order AD converter, k being a natural number.

The solid-state imaging device of the present disclosure may further include a conversion section configured to convert, based on the difference calculated by the calculation section, a digital value obtained by combining a high-order bit digital value and a low-order bit digital value together.

The solid-state imaging device of the present disclosure may further include a threshold voltage generation circuit configured to generate and output voltage having the $2^M$ threshold voltage values. A value for the correction voltage may be one of the $2^M$ threshold voltage values.

In the solid-state imaging device of the present disclosure, the threshold voltage generation circuit may include an output transistor, a comparator, and a ladder circuit. The ladder circuit may include identical $2^M$ resistors or identical $2^M$ capacitors connected together in series, a voltage value at one end of the ladder circuit being a first reference voltage value set at an upper limit of signal voltage and a voltage value at the other end of the ladder circuit being a second reference voltage value set at a lower limit of signal voltage, and selectively outputs, according to a control signal from outside, voltage having one of the $2^M$ threshold voltage values at ends of the $2^M$ resistors or the $2^M$ capacitors. The comparator may compare between an output voltage value from the output transistor and an output voltage value from the ladder circuit to output voltage corresponding to a comparison result to an input terminal of the output transistor.

The solid-state imaging device of the present disclosure may further include a voltage memory circuit. The pixels may output voltage corresponding to reference voltage input from outside to one of the vertical signal lines. The voltage memory circuit may be configured to store voltage having $2^M$ voltage values each corresponding to a difference between a value for the voltage output to the one of the vertical signal lines and each of the $2^M$ threshold voltage values, and output voltage having one of the $2^M$ voltage values as the correction voltage.

In the solid-state imaging device of the present disclosure, each of the pixels may include an amplifier transistor, and a switch transistor connected to an input terminal of the amplifier transistor. The reference voltage may be input to the amplifier transistor through the switch transistor.

In the solid-state imaging device of the present disclosure, a value for the reference voltage may be substantially equal to a value obtained by adding an offset voltage value of the amplifier transistor to upper and lower limits of signal voltage.

In the solid-state imaging device of the present disclosure, the pixels may output voltage corresponding to reference voltage input from outside to one of the vertical signal lines. The correction voltage may be the voltage output to the one of the vertical signal lines.

In the solid-state imaging device of the present disclosure, each of the pixels may include an amplifier transistor, and a switch transistor connected to an input terminal of the amplifier transistor. The reference voltage may be input to the amplifier transistor through the switch transistor.

In the solid-state imaging device of the present disclosure, a value for the reference voltage may be substantially equal to a value obtained by adding an offset voltage value of the amplifier transistor to one of the $2^M$ threshold voltage values.

As described above, according to the solid-state imaging device of the present disclosure, a sufficiently-high AD conversion processing speed can be ensured, and continuity of digital values can be realized.

DETAILED DESCRIPTION

An embodiment of the present disclosure will be described below with reference to drawings.

First Embodiment

A solid-state imaging device of a first embodiment of the present disclosure will be described below with reference to FIGS. 1-5.

Figure 1:
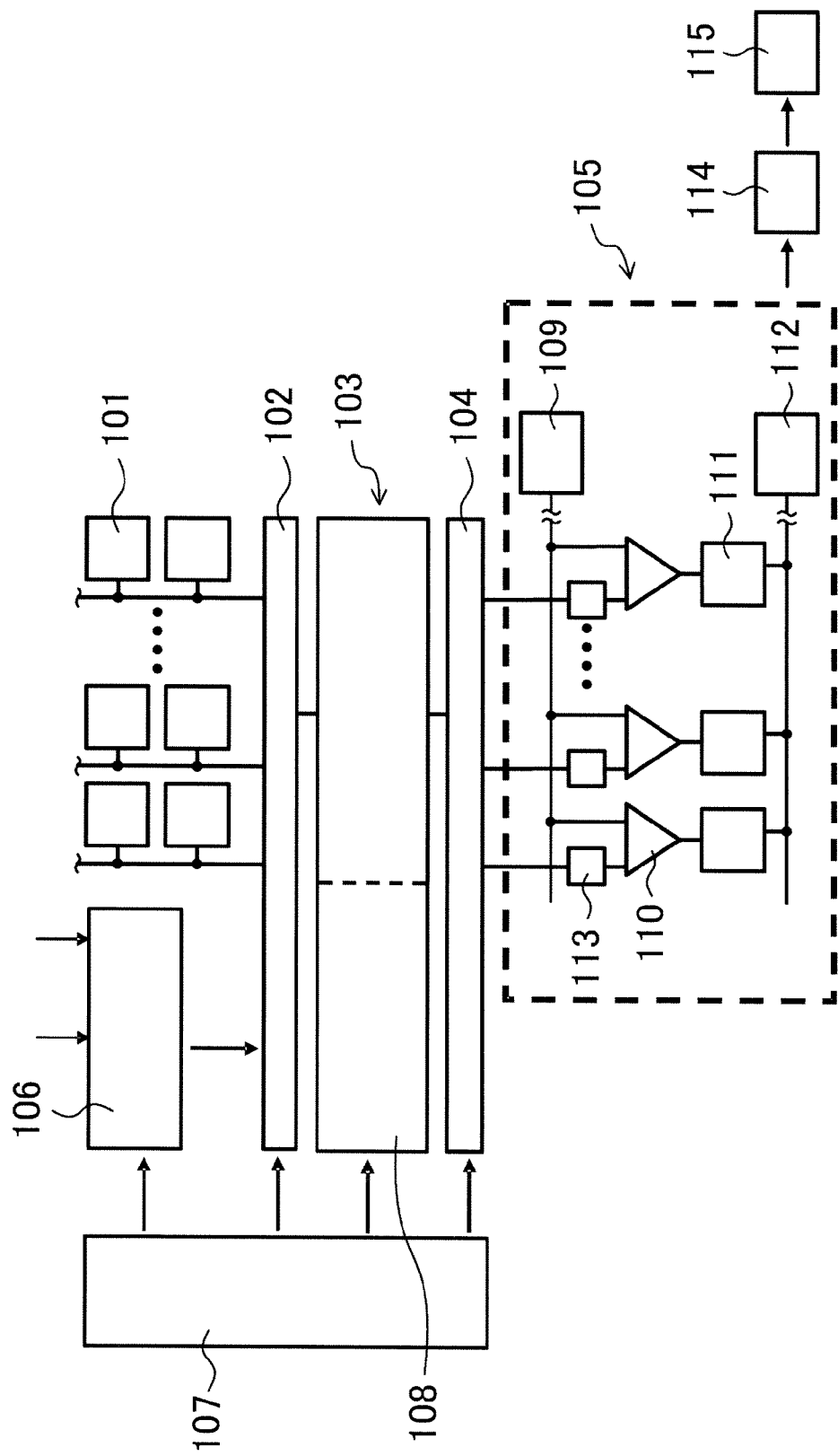
FIG. 1 is a diagram illustrating a solid-state imaging device of a first embodiment of the present disclosure.

FIG. 1 illustrates the solid-state imaging device of the first embodiment of the present disclosure.

A reference numeral "101" represents a pixel. A reference numeral "102" represents a first selection circuit. A reference numeral "103" represents a high-order AD converter. A reference numeral "104" represents a second selection circuit. A reference numeral "105" represents a low-order AD converter. A reference numeral "106" represents a threshold voltage generation circuit. A reference numeral "107" represents a control circuit. A reference numeral "108" represents a zone selection circuit. A reference numeral "109" represents a ramp voltage generation circuit. A reference numeral "110" represents a comparator. A reference numeral "111" represents a counter. A reference numeral "112" represents a counter clock. A reference numeral "113" represents an analog voltage memory (e.g., a capacitor). A reference numeral "114" represents a computing section. A reference numeral "115" represents a converting section.

A plurality of pixels 101 are arranged in a matrix, i.e., in rows (arranged along the horizontal direction as viewed in FIG. 1) and columns (arranged along the vertical direction as viewed in FIG. 1).

The first selection circuit 102 is configured to select one of vertical signal lines connected respectively to the columns of the pixels 101 to connect such a vertical signal line to an input terminal of the high-order AD converter 103.

The high-order AD converter 103 includes an analog output terminal (not shown in the figure) and a digital output terminal (not shown in the figure). A digital value corresponding to an input voltage value is output through the digital output terminal. Voltage having a value (i.e., residual voltage value) obtained by subtracting the voltage value input to the high-order AD converter 103 from the voltage value corresponding to the digital value is output through the analog output terminal.

The second selection circuit 104 is configured to select one from one or more low-order AD converters 105 to connect the selected low-order AD converter 105 to the analog output terminal of the high-order AD converter 103.

As described later, the zone selection circuit 108 is configured to select, when the high-order AD converter 103 is in a "correction mode," voltage which has a residual voltage value corresponding to one of zones and is output through the analog output terminal.

The control circuit 107 is configured to control the first selection circuit 102, the high-order AD converter 103, the zone selection circuit 108, the second selection circuit 104, and the threshold voltage generation circuit 106.

Figure 2:
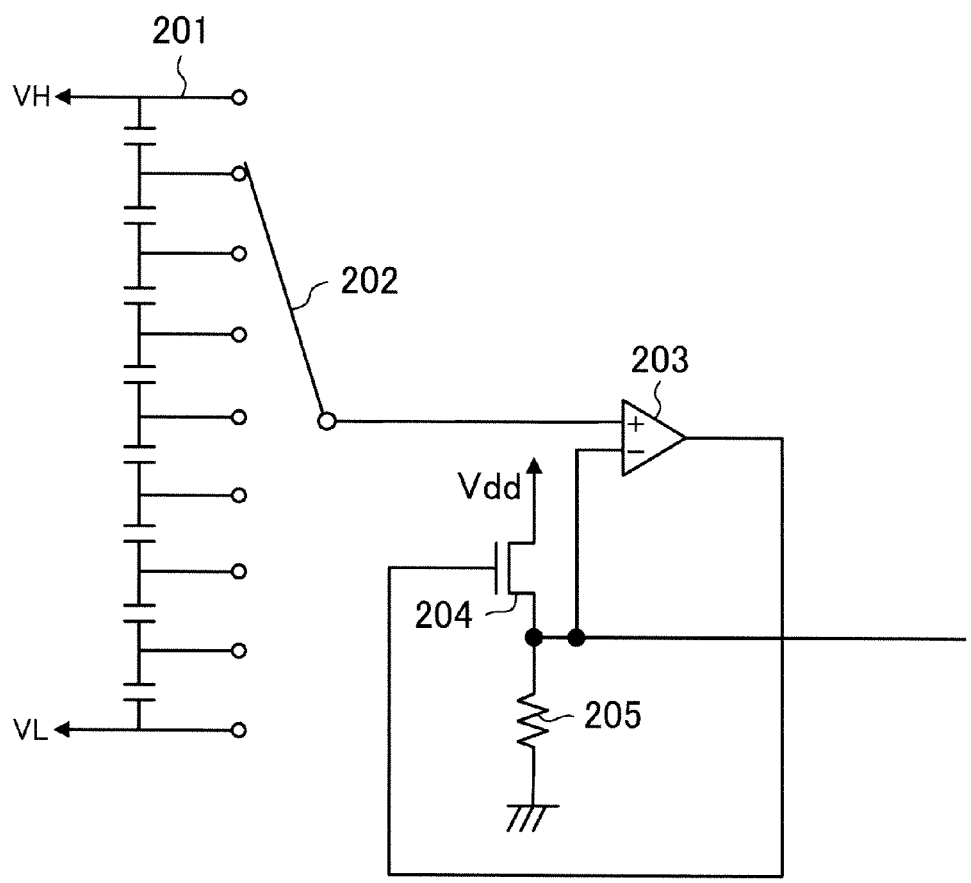
FIG. 2 is a diagram illustrating a threshold voltage generation circuit.

As the threshold voltage generation circuit 106, e.g., a circuit illustrated in FIG. 2 may be employed. The threshold voltage generation circuit will be described below.

FIG. 2 illustrates the threshold voltage generation circuit. A reference numeral "201" represents a ladder circuit. A reference numeral "202" represents a switch. A reference numeral "203" represents an operational amplifier. A reference numeral "204" represents an output transistor. A reference numeral "205" represents a load resistor.

The ladder circuit 201 includes $2^M$ capacitors connected together in series between a first reference voltage value VH and a second reference voltage value VL. That is, a voltage value at one end of the ladder circuit 201 is the first reference voltage value VH, and a voltage value at the other end of the ladder circuit 201 is the second reference voltage value VL. Note that a resistor may be used instead of the capacitor. The $2^M$ capacitors are the same as each other. The first reference voltage value VH is set at the upper limit of signal voltage. The second reference voltage value VL is set at the lower limit of signal voltage.

The switch 202 is configured to select one of ends of the $2^M$ capacitors. Voltage having one of threshold voltage values at the ends of the $2^M$ capacitors is selectively output through the switch 202.

A positive input terminal of the operational amplifier 203 is connected to the switch 202. A negative input terminal of the operational amplifier 203 is connected to an output terminal of the output transistor 204. An output terminal of the operational amplifier 203 is connected to an input terminal of the output transistor 204. If the output transistor 204 is, e.g., a n-type metal oxide semiconductor (MOS) transistor, an output terminal thereof is a drain, and an input terminal thereof is a gate.

The load resistor 205 is, at one terminal thereof, connected to the output terminal of the output transistor 204. The load resistor 205 is, at other terminal thereof, connected to ground. Note that a transistor (e.g., a load transistor) configured such that an input terminal thereof (e.g., a gate) is biased at predetermined voltage may be used instead of the load resistor 205.

Voltage of the threshold voltage generation circuit is output through the output terminal of the output transistor 204.

Since the threshold voltage output through the switch 202 has a high impedance, voltage changes when the threshold voltage generation circuit is actually connected to other circuit such as the high-order AD converter. In order to prevent such a change, the threshold voltage generation circuit includes the operational amplifier 203, the output transistor 204, and the load resistor 205. Thus, the output voltage through the switch 202 is converted so as to have a low impedance, and then the converted voltage is output.

In order to convert output voltage to voltage having a low impedance, a source follower circuit (specifically a source follower circuit including an output transistor 204 and a load resistor 205) or a voltage follower circuit is typically used. However, in the case of the source follower circuit, since voltage having a voltage value obtained by subtracting a predetermined voltage value from an input voltage value is output, there is a disadvantage that an output voltage value equal to the input voltage value cannot be obtained. In the case of the voltage follower circuit, an output voltage value equal to an input voltage value can be obtained. However, an input voltage value range in which the output voltage value equal to the input voltage value can be obtained is not broad. Thus, there is a disadvantage that the first reference voltage value VH and the second reference voltage value VL are limited.

In order to avoid the foregoing disadvantages, the threshold voltage generation circuit of the first embodiment includes the operational amplifier 203, in addition to the output transistor 204 and the load resistor 205. The operational amplifier 203 is configured to provide a negative feedback on the output transistor 204 by using the threshold voltage output through the switch 202 as reference voltage. Thus, an output voltage value through the output transistor 204 becomes equal to the threshold voltage value from the switch 202 after a lapse of a time equal to or longer than a time constant of a negative feedback loop.

An operation of the low-order AD converter will be described below. In the first embodiment, the case where a so-called "single slope type AD converter" is employed as the low-order AD converter will be described as an example. Note that a method for AD conversion is not limited to such a case.

The counter 111 is operated by the counter clock 112. Meanwhile, ramp voltage from the ramp voltage generation circuit 109 is input to one of input terminals of the comparator 110. Residual voltage from the high-order AD converter 103 is input to the other input terminal of the comparator 110 through the analog voltage memory 113. Then, when the ramp voltage value becomes equal to the residual voltage value, the polarity of an output terminal of the comparator 110 changes to stop the operation of the counter 111 connected to the comparator 110. At this point, a counter value stored in the counter 111 is a value corresponding to the residual voltage value, and may be output as a digital value. Note that the counter value may be actually a value corresponding to a value obtained by adding an offset value to the residual voltage value. In such a case, although it is necessary to remove the value corresponding to the offset value from the counter value, the description of such a process will not be made in the first embodiment.

Figure 3:
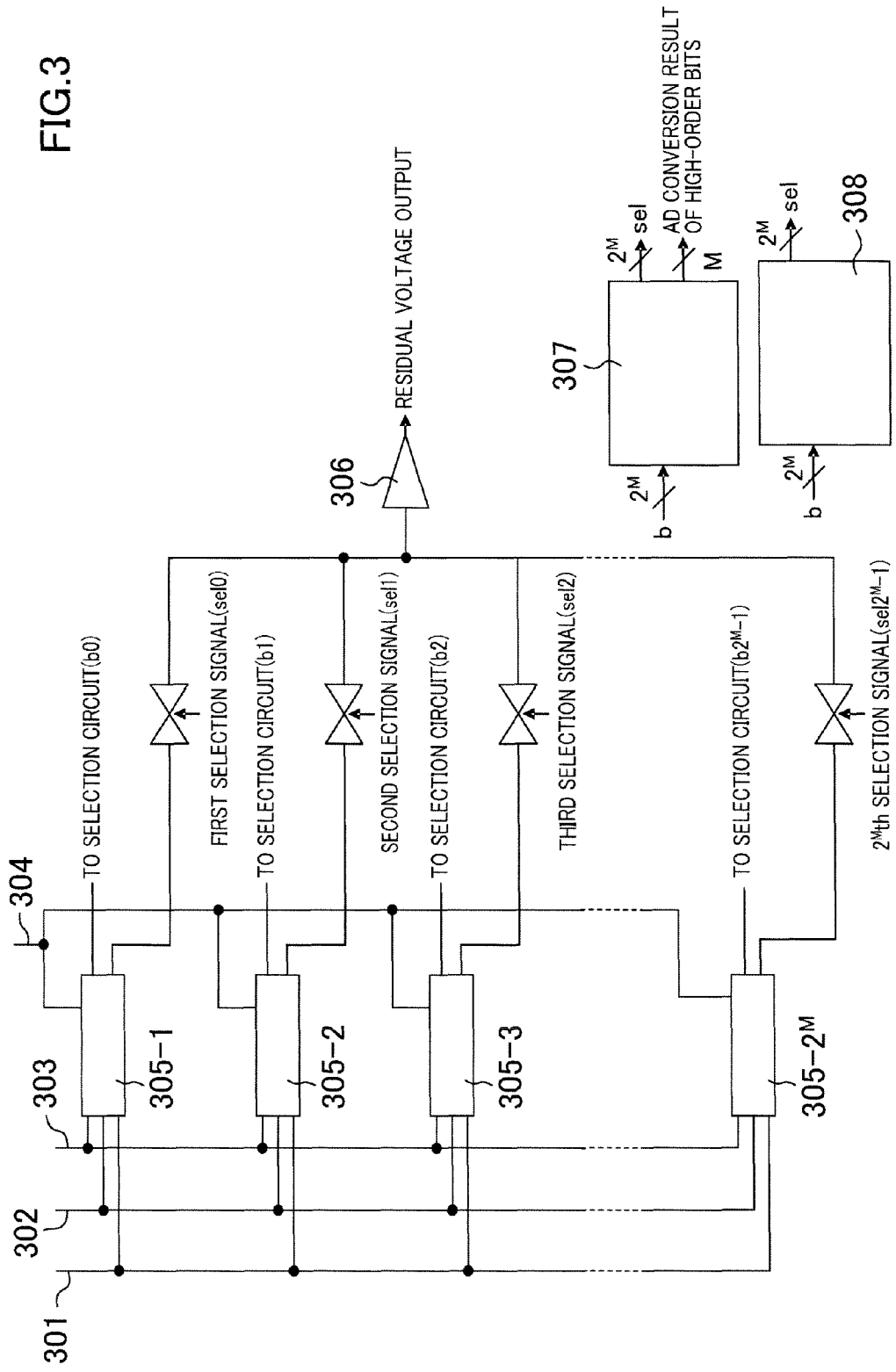
FIG. 3 is a diagram illustrating a high-order AD converter.

As the high-order AD converter, e.g., a circuit illustrated in FIG. 3 may be employed. The high-order AD converter will be described below. Note that the high-order AD converter is not limited to the converter described below.

FIG. 3 illustrates an example circuit of the high-order AD converter.

Reference numerals "301" to "304" each represent a line. Reference numerals "305-1" to "305-$2^M$" represent first to $2^M$ th calculation units, respectively ("M" is the number of bits to be converted by the high-order AD converter). A reference numeral "306" represents an impedance converter. A reference numeral "307" represents a decoder selection circuit. A reference numeral "308" represents a zone selection circuit.

Voltage having a first reference voltage value VH is applied from a reference voltage generation section to the line 301. Voltage having a second reference voltage value VL (VL<VH) is applied from the reference voltage generation section to the line 302. The first reference voltage value VH is set at the upper limit of signal voltage. The second reference voltage value VL is set at the lower limit of signal voltage. Voltage having a signal voltage value Vin is applied from the pixels to the line 303. Voltage having a reset voltage value Vref is applied from the pixels to the line 304.

When the number of bits to be converted by the high-order AD converter is M, calculation units 305-1 to 305-$2^M$ are connected together in parallel.

The impedance converter 306 is configured to convert output voltage from the calculation units 305-1 to 305-$2^M$ to voltage having a low impedance and to output the converted voltage.

As described later, the decoder selection circuit 307 is configured to output a high-order M bit digital value based on output of the calculation units 305-1 to 305-$2^M$ and to select and connect one of the calculation units 305-1 to 305-$2^M$ to the impedance converter 306.

Figure 4:
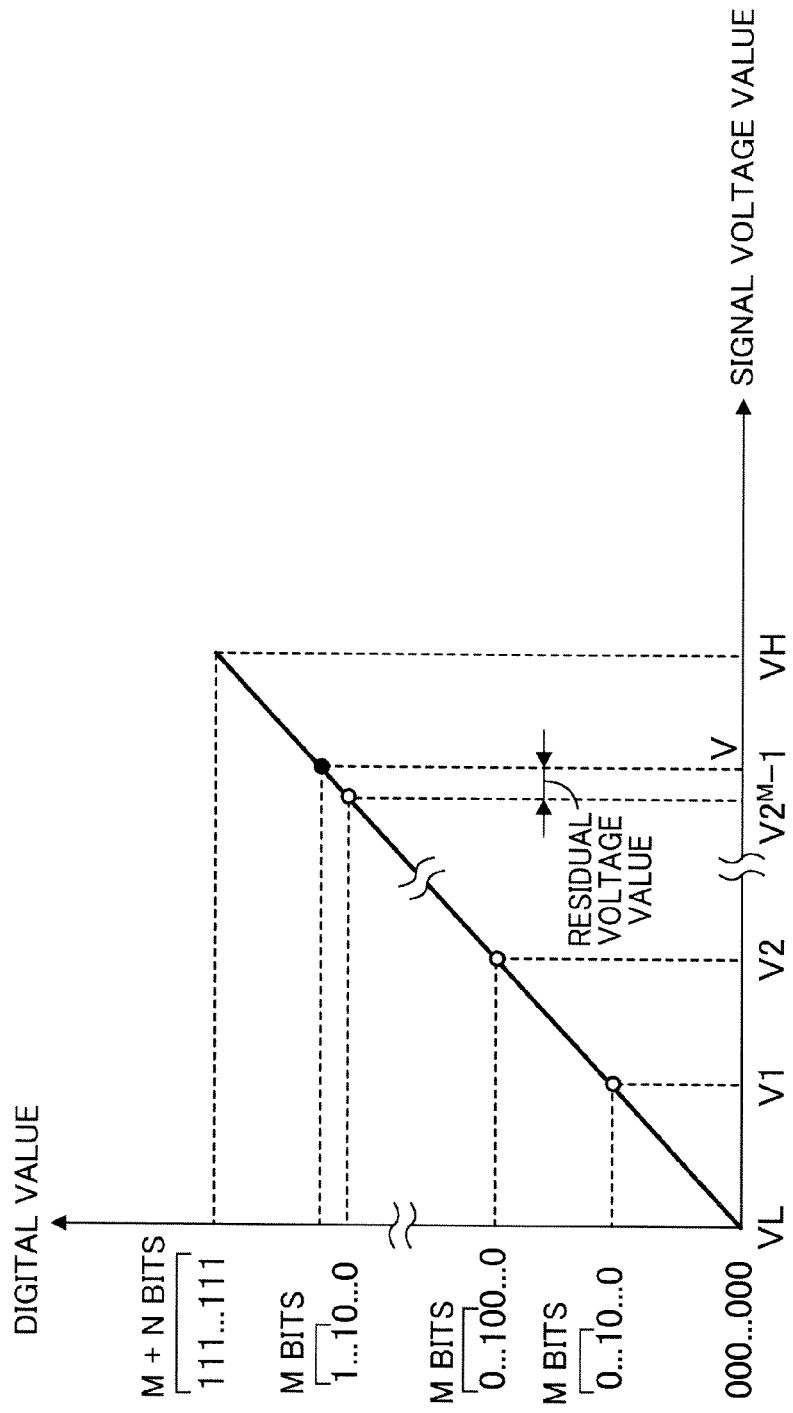
FIG. 4 is a graph illustrating an operation of AD conversion of high-order bits.

An operation of AD conversion of high-order bits will be described below with reference to FIG. 4. FIG. 4 is a graph illustrating the operation of AD conversion of high-order bits.

First, a noise cancellation operation is performed by subtracting a signal voltage value from a reset voltage value. The obtained value does not include an offset voltage value generated due to noise and variation in characteristics of a circuit of the pixel, and substantially depends only on the strength of light entering the pixel. Thus, the obtained value is hereinafter referred to as a "true signal voltage value V."

Next, two voltage values VL, VH (see FIG. 4) from a reference signal section and $2^M-1$ voltage values V1 to V$2^M-1$ (see FIG. 4) are considered. The $2^M-1$ voltage values V1 to V$2^M-1$ are obtained by dividing a difference between the voltage values VH, VL by $2^M$. All of $2^M+1$ voltage values VL to VH are hereinafter referred to as "threshold voltage values." The threshold voltage value corresponds to a value having low-order N bits of 0. Each of the threshold voltage values V1 to V$2^M-1$ is represented by the following equation:

$$VI = VL + \frac{1}{2^M}(VH - VL)$$

where $1 \leq I \leq 2^M-1$ and "I" is an integer.

Magnitudes are compared between the true signal voltage value V and each of the threshold voltage values VL to V$2^M-1$. A high-order M bit digital value corresponding to the maximum threshold voltage value in the range below the true signal voltage value V is an AD conversion result.

For the high-order AD converter, a function to calculate a residual voltage value and output voltage having the residual voltage value is required. The residual voltage value is a difference between the true signal voltage value V and each of the threshold voltage values VL to V$2^M-1$.

Voltage having the first and second reference voltage values VH, VL, the signal voltage value Vin and the reset voltage value Vref is input to each of the calculation units 305-1 to 305-$2^M$. Output from each of the calculation units 305-1 to 305-$2^M$ is input to the decoder selection circuit 307 through an input terminal thereof. The output from each of the calculation units 305-1 to 305-$2^M$ is input to the impedance converter 306 through a switch circuit.

The calculation units 305-1 to 305-$2^M$ correspond to the threshold voltage values VL to V$2^M-1$, respectively. As described above, the calculation units 305-1 to 305-$2^M$ each compare the magnitudes between the true signal voltage value V and each of the threshold voltage values VL to V$2^M-1$, and output the result to the decoder selection circuit 307. In addition, the calculation units 305-1 to 305-$2^M$ each calculate residual voltage values Q1 to Q$2^M$ (Q1=V−VL, Q2=V−V1, ..., Q$2^M$=V−V$2^M-1$), each of which is a difference between the true signal voltage value V and each of the threshold voltage values VL to V$2^M-1$, and output voltage having the residual voltage values Q1 to Q$2^M$.

The decoder selection circuit 307 is configured to decode the output from each of the calculation units 305-1 to 305-$2^M$ to output the high-order M bit digital value corresponding to the maximum threshold voltage value in the range below the true signal voltage value V. In addition, the decoder selection circuit 307 is configured to turn ON a switch connected to an output terminal of the calculation unit corresponding to the maximum threshold voltage value, and to turn OFF switches connected respectively to output terminals of the other calculation units. Thus, voltage having the residual voltage value corresponding to the maximum threshold voltage value is output to the impedance converter 306. The residual voltage value output to the impedance converter 306 corresponds to a low-order N bit digital value.

The impedance converter 306 converts residual voltage to voltage having a low impedance, and outputs such voltage. Note that the impedance converter 306 may have a function to amplify residual voltage.

Figure 10:
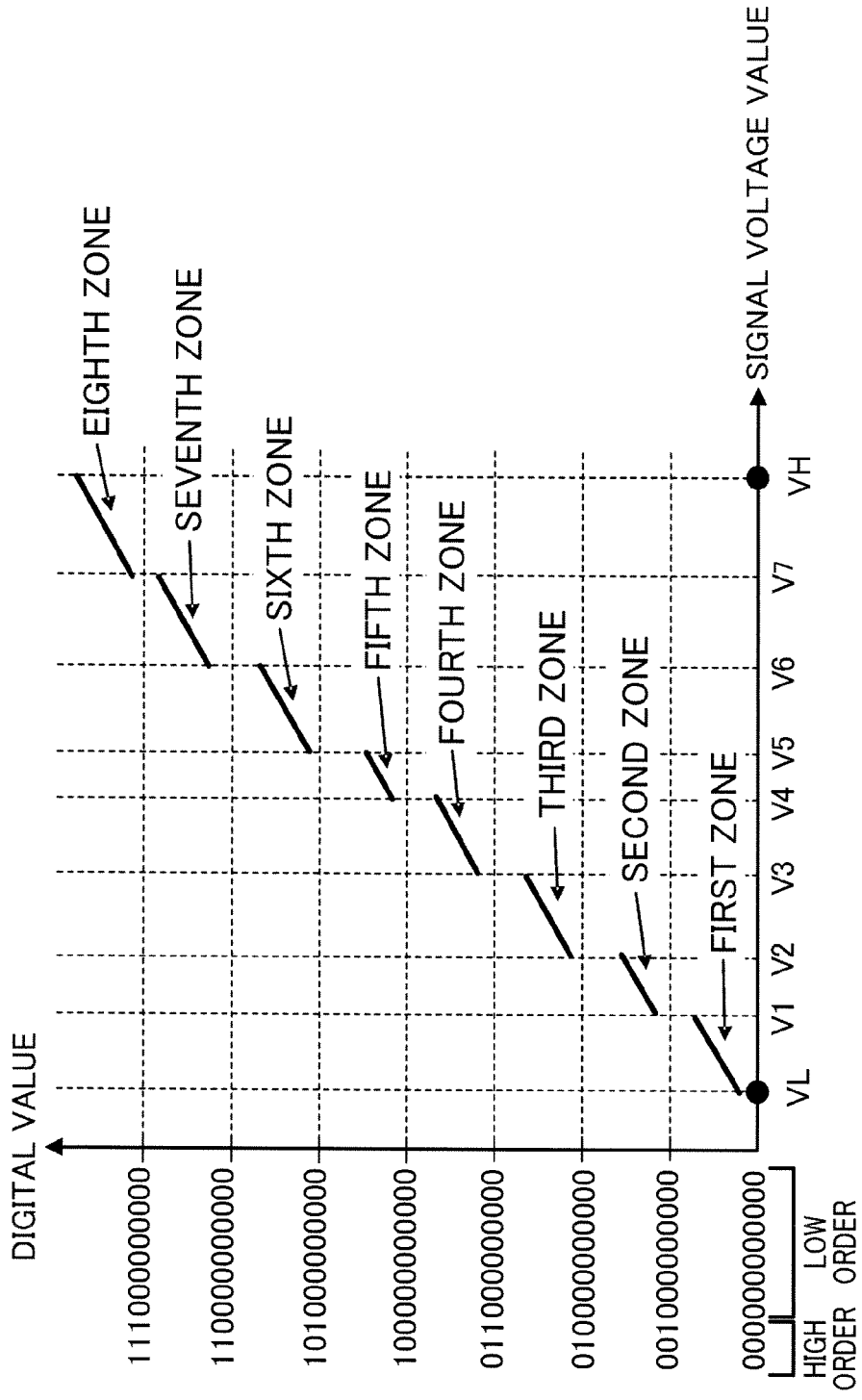
FIG. 10 is a graph illustrating a disadvantage described in a conventional solid-state imaging device.

As described above, the conventional solid-state imaging device has the following disadvantage. Such a disadvantage will be described with reference to FIG. 10. FIG. 10 illustrates the disadvantage described in the conventional solid-state imaging device.

The horizontal axis illustrated in FIG. 10 represents an input signal voltage value. The vertical axis illustrated in FIG. 10 represents an output digital value. The output digital value is obtained by combining a M bit digital value converted by the high-order AD converter and an N bit digital value converted by the low-order AD converter.

Reference numerals "V1" to "V7" each represent a threshold voltage value. The threshold voltage value is defined as a signal voltage value when a value for high-order bits changes. FIG. 10 illustrates the case where M=3 and N=9. However, the same applies to other cases.

Referring to FIG. 10, the digital values are not continuous, and eight line segments are dispersed. The eight line segments are hereinafter referred to as "first to eighth zones," respectively. The first to eighth zones correspond to the first to eighth calculation units 305-1 to 305-8 illustrated in FIG. 3, respectively.

In order for the first to eighth zones to be continuous, it is required to satisfy the following two conditions:
(First Condition) a digital value having low-order bits of 111111111 is output when a residual voltage value is equal to a difference between threshold voltage values; and
(Second Condition) a difference between adjacent ones of threshold voltage values is equal (i.e., the threshold voltage value changes by the same amount).

However, it is substantially difficult that a difference between adjacent ones of the threshold voltage values is equal to a difference between other adjacent ones of the threshold voltage values, and it is also substantially difficult that all of the low-order AD converters have the same characteristics so that the digital value having low-order bits of 111111111 can be output when the residual voltage value is equal to the difference between the threshold voltage values. Thus, it is difficult to satisfy the first and second conditions.

Thus, the following is implemented in the first embodiment.

First, the zone selection circuit (see "108" in FIG. 1 and "308" in FIG. 3) is provided in the high-order AD converter 103.

The high-order AD converter 103 is switched from a "normal mode" to a "correction mode" by the control circuit 107. Specifically, a circuit serving as a switch control circuit is switched from the decoder selection circuit 307 to the zone selection circuit 308.

Next, voltage having a threshold voltage value (see "V1" to "V7" in FIG. 10) is input from the threshold voltage generation circuit 106 to the high-order AD converter 103. As long as the gradients of zones (see the first to eighth zones in FIG. 10) are the same (i.e., the zones are parallel to each other), not voltage having the threshold voltage value but voltage having a value close to the threshold voltage value may be input to the high-order AD converter 103. In the foregoing low-order AD converter, the gradients of zones are typically the same.

For example, the case where voltage having the third threshold voltage value V3 is input to the high-order AD converter 103 will be described below. The same applies to other cases.

When voltage having the third threshold voltage value V3 is input to the high-order AD converter 103, the zone selection circuit 108 selects the third zone (third calculation unit). The residual voltage value in the third zone is AD-converted by the low-order AD converter 105 to obtain a 9-bit digital value as a value C31.

Next, the zone selection circuit 108 selects the fourth zone (fourth calculation unit). The residual voltage value in the fourth zone is AD-converted by the low-order AD converter 105 to obtain a 9-bit digital value as a value C32. Note that the low-order AD converter 105 outputting the value C31 and the low-order AD converter 105 outputting the value C32 may be the same (i.e., the values C31, C32 are output by the same low-order AD converter 105). However, if the characteristics of the low-order AD converters 105 are the same, the second selection circuit 104 may select a low-order AD converter different from the low-order AD converter outputting the value C31 as the low-order AD converter outputting the value C32.

Next, in the computing section 114, the value C31 is subtracted from the value C32 to obtain a value C3 (=C32−C31). The obtained value C3 is stored in the computing section 114. Note that the computing section configured to calculate and store the value C3 may be provided inside or outside the solid-state imaging device.

In the foregoing manner, the value C3 is obtained for the third threshold voltage value V3 by using the values corresponding to the third and fourth zones.

Similarly, e.g., a value C1 is calculated for the first threshold voltage value V1 by using values corresponding to the first and second zones, and a value C2 is calculated for the second threshold voltage value V2 by using values corresponding to the second and third zones. The same process is performed for the fourth to seventh threshold voltage values V4-V7. The obtained values C1-C7 are stored after calculation.

Next, the high-order AD converter 103 is switched from the "correction mode" to the "normal mode," and signal voltage from the pixels is AD-converted. Output 12-bit digital values are discontinuous (see a dashed line in FIG. 5). Thus, the following conversion is performed for the output 12-bit digital values by the converting section 115:
for the case where the high-order bits are 000, the obtained 12-bit digital value;
for the case where the high-order bits are 001, the obtained 12-bit digital value—C1;
for the case where the high-order bits are 010, the obtained 12-bit digital value—C1-C2;
. . .
for the case where the high-order bits are 111, the obtained 12-bit digital value—C1-C2-C3-C4-C5-C6-C7.

Figure 5:
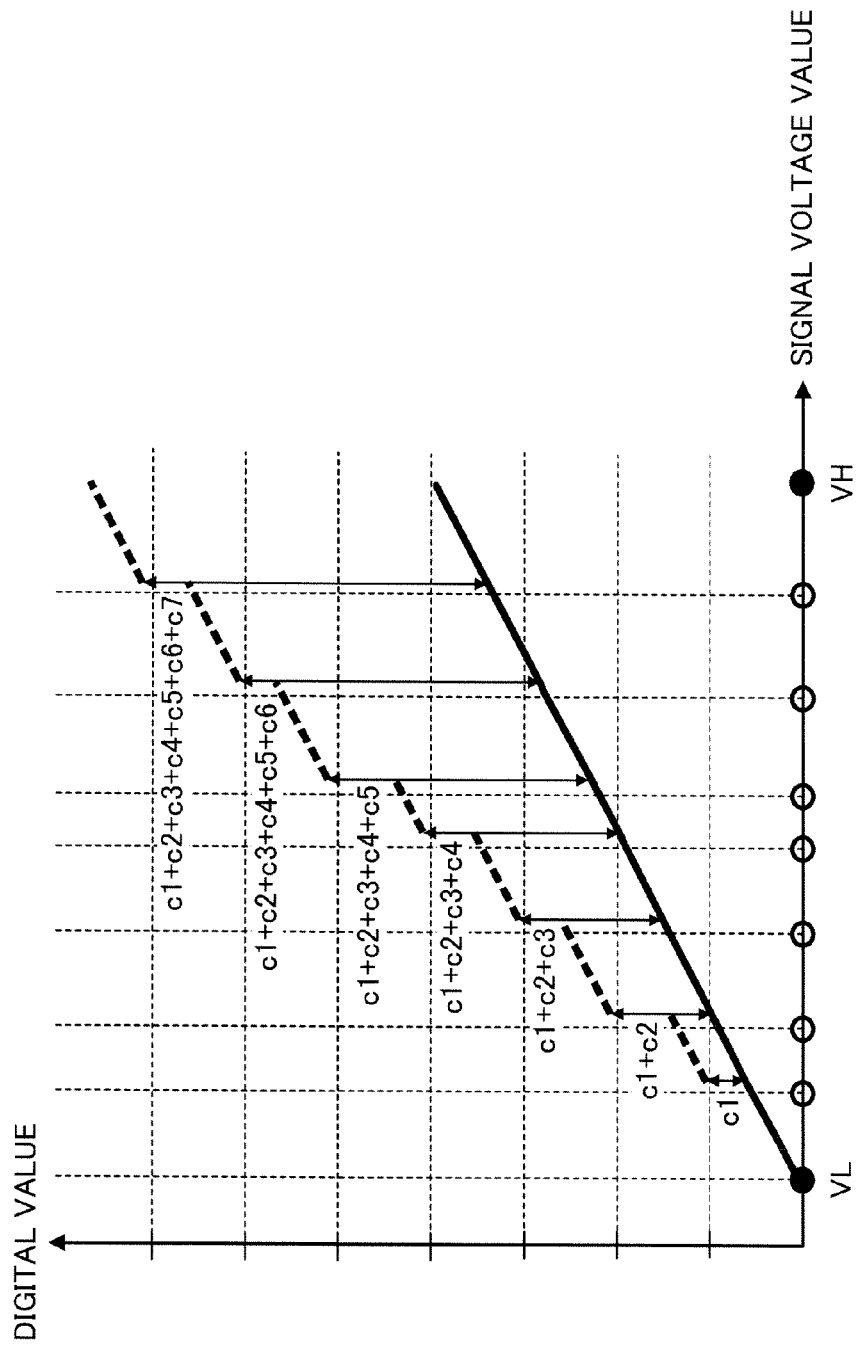
FIG. 5 is a diagram illustrating an advantage described in the present disclosure.

In the foregoing manner, the converted digital values become continuous as illustrated in FIG. 5. That is, the disadvantage described in the conventional solid-state imaging device can be overcome. Note that the conversion section configured to convert the output digital value may be provided inside or outside the solid-state imaging device.

First Variation of First Embodiment

A solid-state imaging device of a first variation of the first embodiment of the present disclosure will be described below with reference to FIGS. 6 and 7. The same names as those shown in the first embodiment are used to represent equivalent elements in the first variation, and therefore the description thereof will not be repeated in the first variation.

Figure 6:
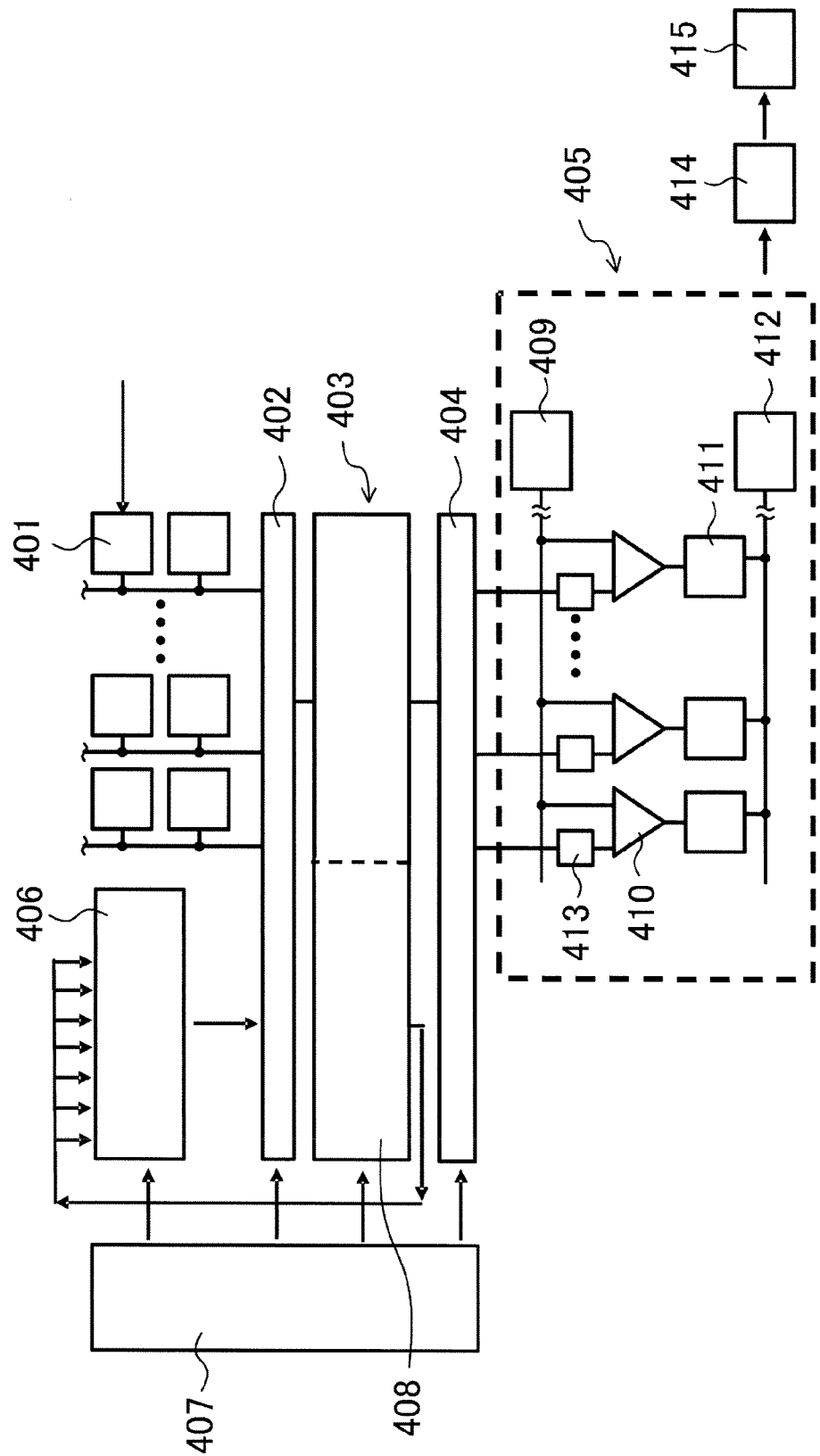
FIG. 6 is a view illustrating a solid-state imaging device of a first variation of the first embodiment of the present disclosure.

FIG. 6 illustrates the solid-state imaging device of the first variation of the first embodiment of the present disclosure.

A reference numeral "401" represents a pixel. A reference numeral "402" represents a first selection circuit. A reference numeral "403" represents a high-order AD converter. A reference numeral "404" represents a second selection circuit. A reference numeral "405" represents a low-order AD converter. A reference numeral "406" represents an analog voltage memory circuit. A reference numeral "407" represents a control circuit. A reference numeral "408" represents a zone selection circuit. A reference numeral "409" represents a ramp voltage generation circuit. A reference numeral "410" represents a comparator. A reference numeral "411" represents a counter. A reference numeral "412" represents a counter clock. A reference numeral "413" represents an analog voltage memory. A reference numeral "414" represents a computing section. A reference numeral "415" represents a converting section.

A plurality of pixels 401 are arranged in a matrix, i.e., in rows (arranged along the horizontal direction as viewed in FIG. 6) and columns (arranged along the vertical direction as viewed in FIG. 6).

The first selection circuit 402 is configured to select one of vertical signal lines connected respectively to the columns of the pixels 401 to connect such a vertical signal line to an input terminal of the high-order AD converter 403.

The high-order AD converter 403 includes an analog output terminal (not shown in the figure) and a digital output terminal (not shown in the figure). A digital value corresponding to an input voltage value is output through the digital output terminal.

The second selection circuit 404 is configured to select one from one or more low-order AD converters 405 to connect the selected low-order AD converter 405 to the analog output terminal of the high-order AD converter 403.

As the low-order AD converter 405, a single slope type AD converter may be employed. However, a method for AD conversion is not limited to the foregoing.

The control circuit 407 is configured to control the first selection circuit 402, the high-order AD converter 403, the zone selection circuit 408, the second selection circuit 404, and the analog voltage memory circuit 406.

Figure 7:
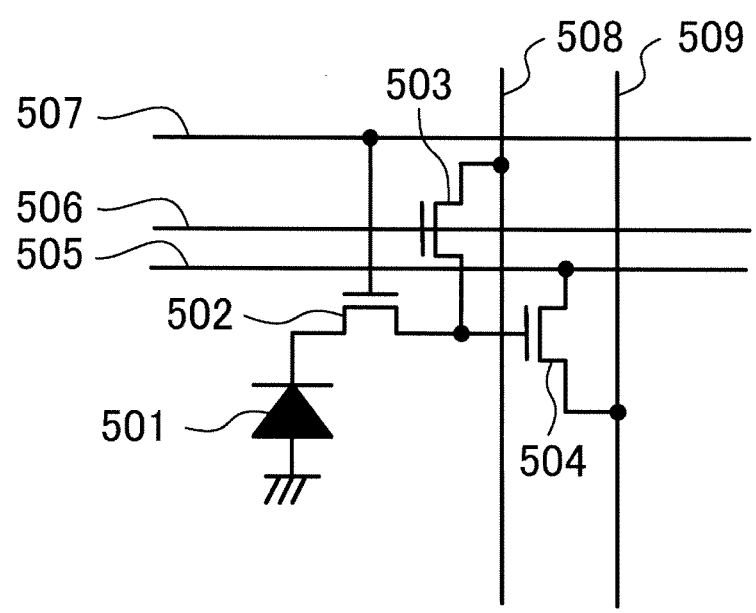
FIG. 7 is a diagram illustrating an example circuit of a pixel.

As the pixel 401, e.g., a pixel illustrated in FIG. 7 may be employed. The pixel will be described below. The pixel is not limited to the foregoing.

FIG. 7 illustrates an example circuit of the pixel.

A reference numeral "501" represents a photodiode. A reference numeral "502" represents a transfer transistor. A reference numeral "503" represents a reset transistor. A reference numeral "504" represents a source follower transistor. A reference numeral "505" represents a power line. A reference numeral "506" represents a reset signal line. A reference numeral "507" represents a transfer gate signal line. A reference numeral "508" represents a reset voltage line. A reference numeral "509" represents a vertical signal line.

An operation of the pixel will be described below. Voltage to be applied to each of the signal lines in order to turn OFF the transistor is hereinafter referred to as "voltage 0," and voltage to be applied to each of the signal lines in order to turn ON the transistor is hereinafter referred to as "voltage 1."

First, the following operation is performed for one of the pixels.

Power-supply voltage, voltage 1, voltage 0, and reset voltage are applied to the power line 505, the reset signal line 506, the transfer gate signal line 507, and the reset voltage line 508, respectively. Next, voltage 0 is applied to the reset signal line 506, and a voltage value of the vertical signal line 509 is read by the high-order AD converter. Such a voltage value is a reset voltage value. Then, voltage 1 is applied to the transfer gate signal line 507. After a while, voltage 0 is applied to the transfer gate signal line 507, and a voltage value of the vertical signal line 509 is read by the high-order AD converter. Such a voltage value is a signal voltage value. Subsequently, voltage 1 and low voltage are applied to the reset signal line 506 and the reset voltage line 508, respectively. After a while, voltage 0 is applied to the reset signal line 506, the voltage of the power line 505 is turned off.

After the foregoing operation is performed, the similar operation is performed for another one of the pixels.

An operation of the solid-state imaging device of the first variation of the first embodiment of the present disclosure will be described below. Note that the description which has been made in the first embodiment will not be repeated in the first variation. The case where M=3 and N=9 has been described in the first variation. The same applies to other cases.

First, the high-order AD converter 403 is switched from a "normal mode" to a "correction mode" by the control circuit 407.

Next, voltage having a voltage value of VH+VL (a first reference voltage value VH and a second reference voltage value VL) is input from the pixels 401. Specifically, in the case where, e.g., the pixel illustrated in FIG. 7 is used as a pixel, the following is performed for one of the pixels. First, power-supply voltage, voltage 1, and voltage 0 are applied to the power line 505, the reset signal line 506, and the transfer gate signal line 507, respectively. Next, voltage having a voltage value of VH+VL+Vt is input to the reset voltage line 508. The "Vt" represents an offset voltage value obtained by subtracting an output voltage value from an input voltage value of the source follower transistor 504. Thus, the voltage having the voltage value of VH+VL can be output from the vertical signal line 509.

Next, the zone selection circuit 408 selects a second zone (second calculation unit). At this point, a voltage value output through the analog output terminal of the high-order AD converter is VH+VL−V1≈V7. Note that a voltage value changes from V1 to V7 by the substantially same amount. Voltage having such a voltage value is stored in the analog voltage memory circuit 406.

As described above, the zone selection circuit 408 selects the second zone to obtain the voltage value V7, and voltage having such a value is stored in the analog voltage memory circuit 406.

Similarly, the zone selection circuit 408 sequentially selects third, fourth, . . . , and eighth zones to obtain voltage values V6, V5, . . . , and V1, and voltage having such values is sequentially stored in the analog voltage memory circuit 406.

Next, voltage having the voltage value V1 stored in the analog voltage memory circuit 406 is input from the analog voltage memory circuit 406 to the high-order AD converter 403, and a value C1 is calculated by using the voltage value V1 in the similar manner to that of the first embodiment.

Similarly, a value C2 is calculated by using the voltage value V2, and a value C3 is calculated by using the voltage value V3. The same applies to the voltage values V4 to V8.

Subsequently, the similar process to that of the first embodiment is performed.

It is actually difficult that voltage precisely having a voltage value of VH+VL is output from the vertical signal line. However, since the zones are parallel to each other as illustrated in FIG. 10, the values C1 to C7 contain few error even if there are some errors in the output voltage value from the vertical signal line.

Second Variation of First Embodiment

A solid-state imaging device of a second variation of the first embodiment of the present disclosure will be described below with reference to FIG. 8. The same names as those shown in the first embodiment are used to represent equivalent elements in the second variation, and therefore the description thereof will not be repeated in the second variation.

Figure 8:
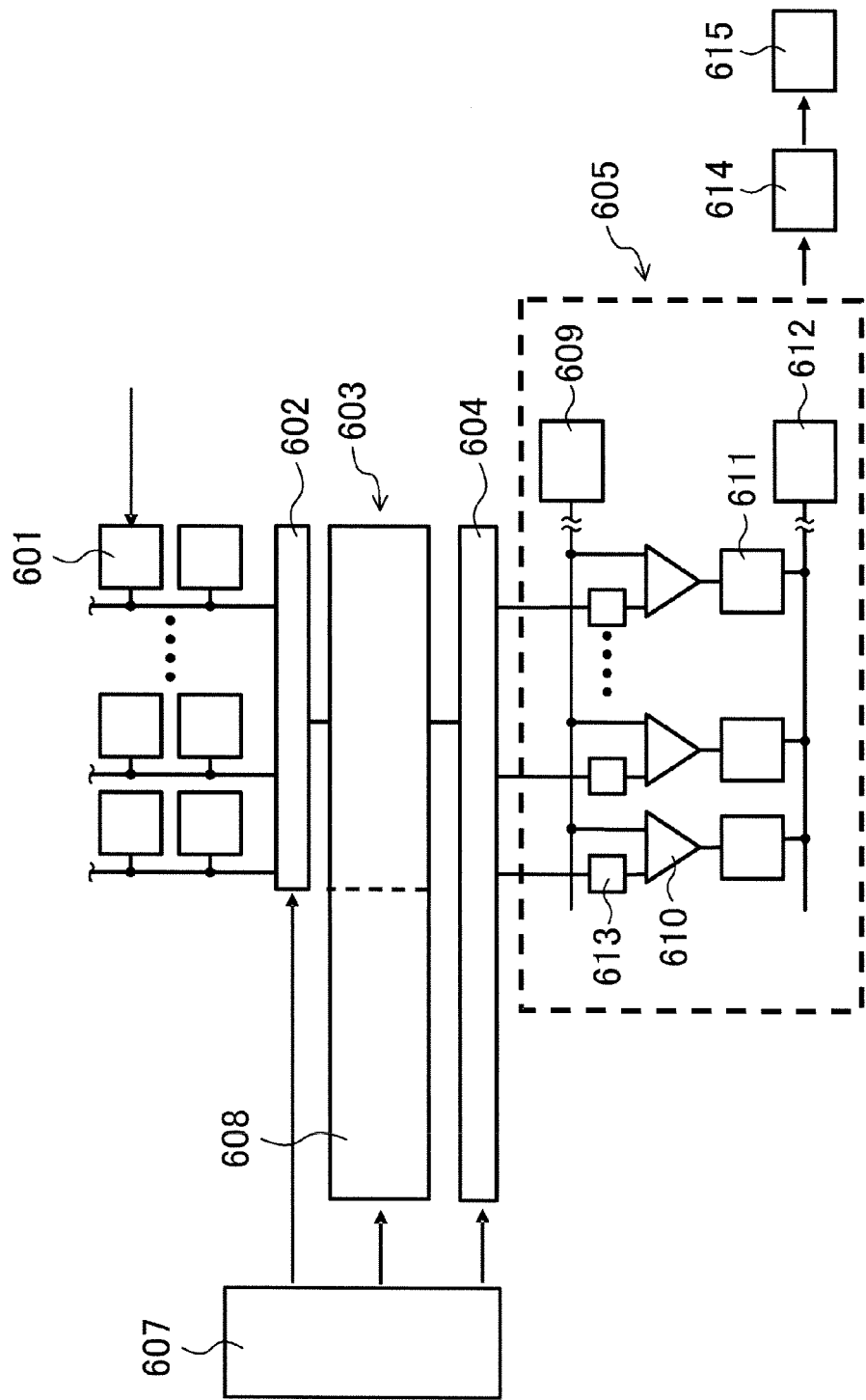
FIG. 8 is a diagram illustrating a solid-state imaging device of a second variation of the first embodiment of the present disclosure.
Figure 9:
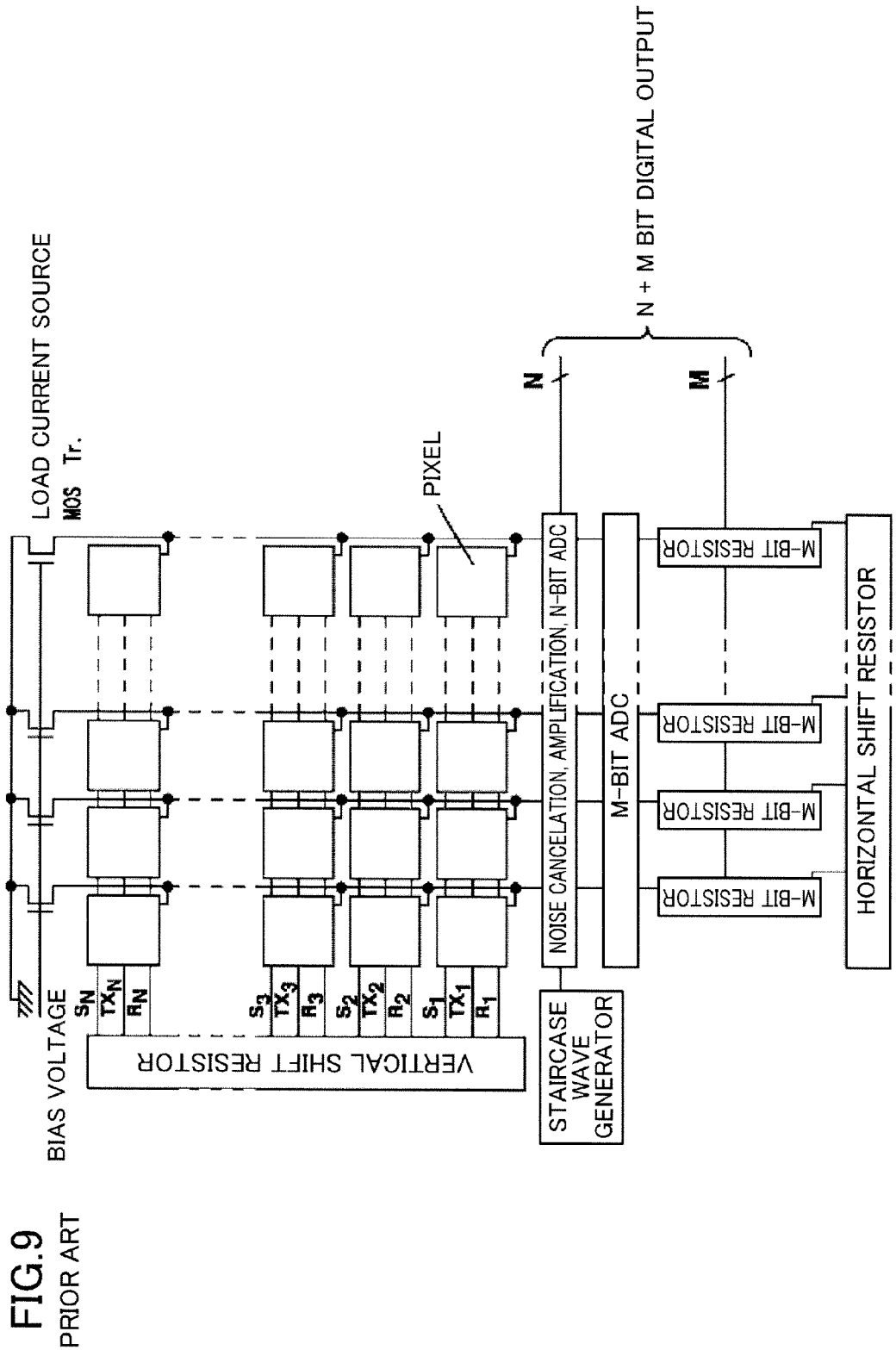
FIG. 9 is a diagram illustrating a conventional solid-state imaging device.

FIG. 8 illustrates the solid-state imaging device of the second variation of the first embodiment of the present disclosure.

A reference numeral "601" represents a pixel. A reference numeral "602" represents a first selection circuit. A reference numeral "603" represents a high-order AD converter. A reference numeral "604" represents a second selection circuit. A reference numeral "605" represents a low-order AD converter. A reference numeral "607" represents a control circuit. A reference numeral "608" represents a zone selection circuit. A reference numeral "609" represents a ramp voltage generation circuit. A reference numeral "610" represents a comparator. A reference numeral "611" represents a counter. A reference numeral "612" represents a counter clock. A reference numeral "613" represents an analog voltage memory. A reference numeral "614" represents a computing section. A reference numeral "615" represents a converting section.

A plurality of pixels 601 are arranged in a matrix, i.e., in rows (arranged along the horizontal direction as viewed in FIG. 8) and columns (arranged along the vertical direction as viewed in FIG. 8).

The first selection circuit 602 is configured to select one of vertical signal lines connected respectively to the columns of the pixels 601 to connect such a vertical signal line to an input terminal of the high-order AD converter 603.

The high-order AD converter 603 includes an analog output terminal (not shown in the figure) and a digital output terminal (not shown in the figure). A digital value corresponding to an input voltage value is output through the digital output terminal.

The second selection circuit 604 is configured to select one from one or more low-order AD converters 605 to connect the selected low-order AD converter 605 to the analog output terminal of the high-order AD converter 603.

As the low-order AD converter 605, a single slope type AD converter may be employed. However, a method for AD conversion is not limited to the foregoing.

The control circuit 607 is configured to control the first selection circuit 602, the high-order AD converter 603, the zone selection circuit 608, and the second selection circuit 604.

An operation of the solid-state imaging device of the second variation of the first embodiment of the present disclosure will be described below. Note that the description which has been made in the first embodiment will not be repeated in the second variation. The case where M=3 and N=9 has been described in the second variation. The same applies to other cases.

First, the high-order AD converter 603 is switched from a "normal mode" to a "correction mode" by the control circuit 607.

Next, voltage having a voltage value V1 is input from the pixels 601. Specifically, in the case where, e.g., the pixel illustrated in FIG. 7 is used as the pixel 601, the following is performed for one of the pixels 601. First, power-supply voltage, voltage 1, and voltage 0 are applied to a power line 505, a reset signal line 506, and a transfer gate signal line 507, respectively. Next, voltage having a voltage value of V1+Vt is input to a reset voltage line 508. Thus, the voltage having the voltage value V1 can be output from a vertical signal line 509.

Next, voltage having the voltage value V1 output from the pixels 601 is input to the high-order AD converter 603, and a value C1 is calculated by using the voltage value V1 in the similar manner to that of the first embodiment.

Similarly, a value C2 is calculated by using a voltage value V2, and a value C3 is calculated by using a voltage value V3. The same applies to voltage values V4 to V7.

Subsequently, the similar process to that of the first embodiment is performed.

As described above, the solid-state imaging device of the present disclosure ensures a sufficiently-high AD conversion processing speed, and continuity of digital values can be realized. Thus, the solid-state imaging device of the present disclosure is useful for, e.g., an electronic still camera.

What is claimed is:

1. A solid-state imaging device comprising:
   a plurality of pixels arranged in rows and columns;
   a plurality of vertical signal lines each connecting pixels in each of the columns;
   a high-order AD converter configured to convert M bits;
   one or more low-order AD converters;
   a first selection circuit corresponding to the high-order AD converter; and
   a second selection circuit corresponding to the high-order AD converter,
   wherein the first selection circuit selects, in a normal mode, one of the vertical signal lines to output voltage of the selected one of the vertical signal lines, and output correction voltage in a correction mode,
   the high-order AD converter
      calculates $2^M$ residual voltage values each corresponding to a difference between a signal voltage value obtained based on output of the first selection circuit and each of $2^M$ threshold voltage values,
      outputs, in the normal mode, a high-order bit digital value corresponding to a maximum one of the $2^M$ threshold voltage values in a range below the signal voltage value, and outputs voltage having a residual voltage value corresponding to the maximum one of the $2^M$ threshold voltage values, and
      outputs, in the correction mode, voltage having a residual voltage value corresponding to a selected threshold voltage value which is any one of the $2^M$ threshold voltage values, and
   the second selection circuit selects one of the low-order AD converters to connect the one of the low-order AD converters to an output terminal of the high-order AD converter.

2. The solid-state imaging device of claim 1, wherein
   the high-order AD converter includes
      $2^M$ calculation sections each calculating and outputting an associated one of the $2^M$ residual voltage values corresponding respectively to the $2^M$ threshold voltage values and outputting a result indicating a magnitude relationship between the signal voltage value and each of the $2^M$ threshold voltage values,
      a selection circuit which outputs, based on the result indicating the magnitude relationship output from each of the $2^M$ calculation sections, the high-order bit digital value corresponding to the maximum one of the $2^M$ threshold voltage values in the range below the signal voltage value, and which selects the voltage having the residual voltage value corresponding to the maximum one of the $2^M$ threshold voltage values, and
      a selection circuit which selects voltage having one of the $2^M$ residual voltage values corresponding to the selected threshold voltage value.

3. The solid-state imaging device of claim 1, further comprising:
   a calculation section configured to calculate, in the correction mode, a difference between
   an output value of one of the low-order AD converters in a case where voltage having a residual voltage value corresponding to a $k^{th}$ largest one of the $2^M$ threshold voltage values is output from the high-order AD converter and
   an output value of the one of the low-order AD converters in a case where voltage having a residual voltage value corresponding to a (k+1)$^{th}$ largest one of the $2^M$ threshold voltage values is output from the high-order AD converter, k being a natural number.

4. The solid-state imaging device of claim 3, further comprising:
a conversion section configured to convert, based on the difference calculated by the calculation section, a digital value obtained by combining a high-order bit digital value and a low-order bit digital value together.

5. The solid-state imaging device of claim 1, further comprising:
a threshold voltage generation circuit configured to generate and output voltage having the $2^M$ threshold voltage values,
wherein a value for the correction voltage is one of the $2^M$ threshold voltage values.

6. The solid-state imaging device of claim 5, wherein
the threshold voltage generation circuit includes
an output transistor,
a comparator, and
a ladder circuit, and
the ladder circuit
includes identical $2^M$ resistors or identical $2^M$ capacitors connected together in series, a voltage value at one end of the ladder circuit being a first reference voltage value set at an upper limit of signal voltage and a voltage value at the other end of the ladder circuit being a second reference voltage value set at a lower limit of signal voltage, and
selectively outputs, according to a control signal from outside, voltage having one of the $2^M$ threshold voltage values at ends of the $2^M$ resistors or the $2^M$ capacitors, and
the comparator compares between an output voltage value from the output transistor and an output voltage value from the ladder circuit to output voltage corresponding to a comparison result to an input terminal of the output transistor.

7. The solid-state imaging device of claim 1, further comprising:
a voltage memory circuit,
wherein the pixels output voltage corresponding to reference voltage input from outside to one of the vertical signal lines, and
the voltage memory circuit is configured to
store voltage having $2^M$ voltage values each corresponding to a difference between a value for the voltage output to the one of the vertical signal lines and each of the $2^M$ threshold voltage values, and
output voltage having one of the $2^M$ voltage values as the correction voltage.

8. The solid-state imaging device of claim 7, wherein
each of the pixels includes
an amplifier transistor, and
a switch transistor connected to an input terminal of the amplifier transistor, and
the reference voltage is input to the amplifier transistor through the switch transistor.

9. The solid-state imaging device of claim 8, wherein
a value for the reference voltage is substantially equal to a value obtained by adding an offset voltage value of the amplifier transistor to upper and lower limits of signal voltage.

10. The solid-state imaging device of claim 1, wherein
the pixels output voltage corresponding to reference voltage input from outside to one of the vertical signal lines, and
the correction voltage is the voltage output to the one of the vertical signal lines.

11. The solid-state imaging device of claim 10, wherein
each of the pixels includes
an amplifier transistor, and
a switch transistor connected to an input terminal of the amplifier transistor, and
the reference voltage is input to the amplifier transistor through the switch transistor.

12. The solid-state imaging device of claim 11, wherein
a value for the reference voltage is substantially equal to a value obtained by adding an offset voltage value of the amplifier transistor to one of the $2^M$ threshold voltage values.

* * * * *